US008649049B2

(12) United States Patent
Hosoda

(10) Patent No.: US 8,649,049 B2
(45) Date of Patent: Feb. 11, 2014

(54) IMAGE FORMING APPARATUS, JOB MANAGEMENT METHOD, AND STORAGE MEDIUM IN WHICH A JOB DESIGNATED IN A JOB LIST FOR REPRINTING CAN BE SECURELY REPRINTED

(75) Inventor: Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 13/253,573

(22) Filed: Oct. 5, 2011

(65) Prior Publication Data

US 2012/0092711 A1  Apr. 19, 2012

(30) Foreign Application Priority Data

Oct. 19, 2010  (JP) ................................. 2010-234859

(51) Int. Cl.
*G06K 15/00*  (2006.01)
(52) U.S. Cl.
USPC .......................... 358/1.16; 358/1.15; 358/1.13
(58) Field of Classification Search
CPC ........... G06K 15/1886; G06K 15/1861; G06F 3/1274; G06F 3/1295
USPC ............................... 358/1.15, 1.16
See application file for complete search history.

(56) References Cited

U.S. PATENT DOCUMENTS

| 8,347,379 B2* | 1/2013 | Tsuzuki .......................... 726/21 |
| 2004/0017583 A1* | 1/2004 | Kageyama et al. .......... 358/1.15 |
| 2005/0254080 A1* | 11/2005 | Kim ............................ 358/1.13 |
| 2007/0002338 A1* | 1/2007 | Kim ............................. 358/1.1 |
| 2007/0201091 A1* | 8/2007 | Tanaka ........................ 358/1.16 |
| 2009/0086270 A1* | 4/2009 | Miyazawa ................... 358/1.15 |
| 2010/0002251 A1* | 1/2010 | Tachibana ................... 358/1.15 |
| 2010/0309513 A1* | 12/2010 | Aizawa et al. ............... 358/1.15 |
| 2011/0051158 A1* | 3/2011 | Yamahata et al. ............ 358/1.9 |
| 2013/0070281 A1* | 3/2013 | Utsumi ....................... 358/1.14 |
| 2013/0135679 A1* | 5/2013 | Shinagawa .................. 358/1.16 |
| 2013/0194609 A1* | 8/2013 | Tanaka ........................ 358/1.14 |

FOREIGN PATENT DOCUMENTS

JP   2001-063158 A   3/2001

* cited by examiner

*Primary Examiner* — Benjamin O Dulaney
(74) *Attorney, Agent, or Firm* — Canon U.S.A., Inc. IP Division

(57) ABSTRACT

An image forming apparatus includes a storage unit configured to store job data transmitted from an information processing apparatus, a display unit configured to display information of the job data stored in the storage unit when an execution instruction for executing the job data is received in response to a user operation, and a deletion unit configured to determine whether the display unit displays the information of the job data and, to suspend deletion processing for deleting the job data from the storage unit in a case where the deletion unit determines that the display unit displays the information of the job data, whereas to delete the job data from the storage unit in a case where the deletion unit determines that the display unit displays no information of the job data.

7 Claims, 8 Drawing Sheets

FIG. 4

| JOB ID | JOB OWNER | JOB NAME | JOB SIZE | STORED TIME | LAST PRINT TIME |
|---|---|---|---|---|---|
| JID001 | UID004 | SHARING LIST | 300KB | 2000/01/23 09:33 | 2000/01/24 14:15 |
| JID002 | UID003 | SCHEDULE | 1,200KB | 2000/01/23 09:50 | 2000/01/23 09:55 |
| JID003 | UID004 | REPORT | 2,500KB | 2000/01/24 11:10 | 2000/01/24 11:15 |
| ... | ... | ... | ... | ... | ... |

FIG. 5C

| REPRINTABLE JOB LIST |
| --- |
| SHARING LIST |
| REPORT |
| CONTRACT |
| BRIEFING PAPER |

FIG. 5D

| IS REPRINT TO BE STARTED? |
| --- |
| YES |
| NO |
| JOB NAME:SHARING LIST |

IMAGE FORMING APPARATUS, JOB MANAGEMENT METHOD, AND STORAGE MEDIUM IN WHICH A JOB DESIGNATED IN A JOB LIST FOR REPRINTING CAN BE SECURELY REPRINTED

BACKGROUND OF THE INVENTION

1. Field of the Invention

The present invention relates to an image forming apparatus, a job management method, and a storage medium.

2. Description of the Related Art

There has been a demand that a user desires to print one more set of documents after it is printed. Japanese Patent Laid-open Publication No. 2001-63158 discloses a printing technique for printing documents according to a reprint instruction (hereinafter referred to as reprint) via an operation of a panel of an image forming apparatus without a need for retransmission of print data thereof from a data processing apparatus.

In a normal print processing, the image forming apparatus stores a print job of print data transmitted from the data processing apparatus in a storage device of the image forming apparatus and deletes the stored print job after completing print processing of the print job. On the other hand, in a reprint mode in a reprint technique, the image forming apparatus keeps storing the stored print job without deleting the stored print job after completing the print processing until the storage device comes to be short of a space. With the above configuration, a user can reprint a document (image) having been printed once according to the reprint instruction via the operation of the panel of the image forming apparatus without a necessity of retransmission of the print data from the data processing apparatus.

In the reprint mode, the image forming apparatus stores the print job in a job spool area in a storage device. As a result thereof, when a capacity of the job spool area becomes full, the image forming apparatus has to delete any one of the print jobs stored in the job spool area to clear an area for storing the next print job. For example, Japanese Patent Laid-open Publication No. 2001-63158 discloses an image forming apparatus that deletes print data having the oldest storage time-and-date information in all the pieces of print data stored in the job spool area when the image forming apparatus receives print data, thereby securing an area for storing the next print data.

However, in a case where jobs stored in the job spool area are displayed on a user interface (UI) screen in the form of a job list in response to a reprinting request by the user via an operation panel, a job having the oldest time-and-date information can also be displayed. At the moment, if the image forming apparatus receives new print data immediately after receiving an execution instruction for reprinting the job having the oldest time-and-date information, it deletes the job having the oldest time-and-date information that is selected as a target of reprinting to secure a space for the new print data in the job spool area. Namely, a problem may come up that the job the user instructed to reprint it cannot be performed.

SUMMARY OF THE INVENTION

The present invention is directed to an image forming apparatus capable of providing a suitable response with respect to execution of a job based on a user operation.

According to an aspect of the present invention, an image forming apparatus includes a storage unit configured to store job data transmitted from an information processing apparatus, a display unit configured to display information of the job data stored in the storage unit when an execution instruction for executing the job data is received in response to a user operation, and a deletion unit configured to determine whether the display unit displays the information of the job data and, to suspend deletion processing for deleting the job data from the storage unit in a case where the deletion unit determines that the display unit displays the information of the job data, whereas to delete the job data from the storage unit in a case where the deletion unit determines that the display unit displays no information of the job data.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a table for managing stored jobs.

FIGS. 5A through 5D illustrate examples of user interface (UI) screens.

DESCRIPTION OF THE EMBODIMENTS

Various exemplary embodiments, features, and aspects of the invention will be described in detail below with reference to the drawings.

A first exemplary embodiment of the present invention is described below with reference to drawings attached hereto. Exemplary embodiments are not limiting the scope of the present invention. Also, all the configurations described in the exemplary embodiments are not always essential to a means for solving the problems of the present invention.

Figure 1:
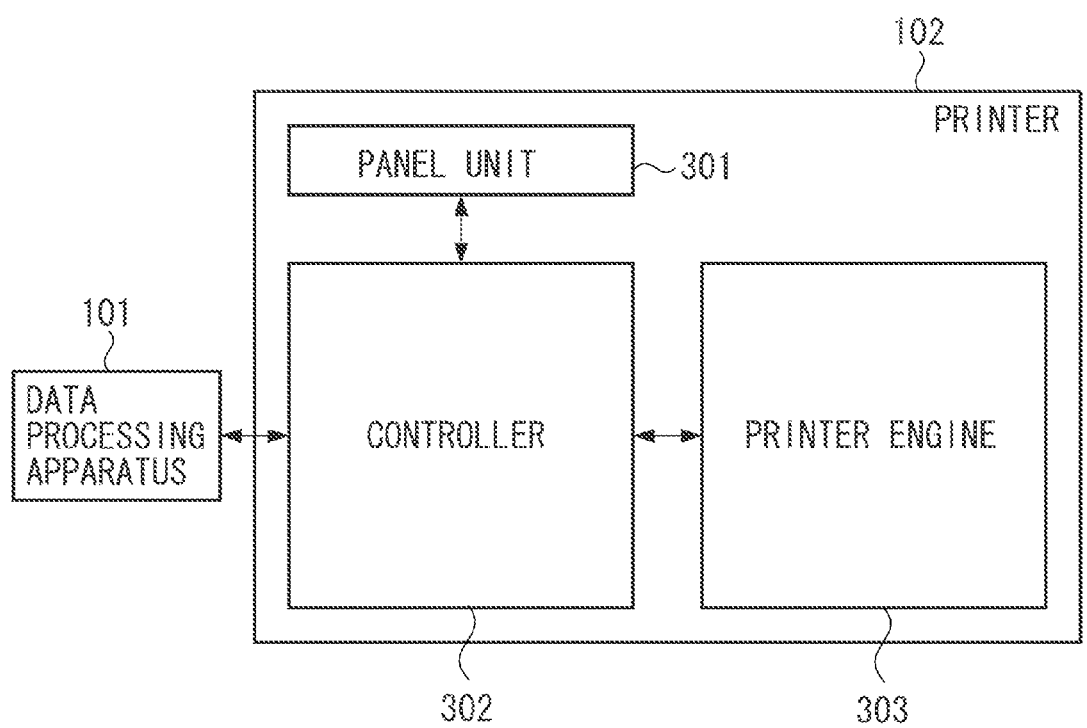
FIG. 1 illustrates an example of a configuration of a printing system.

A configuration of a printer is described below. FIG. 1 illustrates an example of a configuration of a printing system according to the present exemplary embodiment. The printing system includes a data processing apparatus 101 and a printer 102.

The data processing apparatus 101 is an example of an information processing apparatus (i.e., a computer) and functions as a supply source of image information (e.g., page description language (PDL) information described in a page description language). The printer 102 is an example of an image forming apparatus (i.e., a computer). A laser beam printer is employed as the printer 102 in the present exemplary embodiment. The image forming apparatus applied to the present exemplary embodiment is not limited to the laser beam printer but may be printers other than the laser beam printer, e.g., an ink jet printer.

The printer 102 includes a panel unit 301, a printer controller (controller) 302, and a printer engine 303. The panel unit 301 includes a touch panel display (an example of a display unit) and is used as a user interface. The panel unit 301 may include operation buttons for operating information displayed on a display.

The controller 302 receives a desired operation instruction (i.e., a user operation) from a user via the panel unit 301. The controller 302 displays processing contents of the printer 102 and alarm contents to the user via the panel unit 301. The controller 302 generates raster data for each page based on image information (e.g., print data as an example of job data) supplied from the data processing apparatus 101 and transmits it to the printer engine 303.

The printer engine 303 forms a latent image on a photosensitive drum based on the raster data supplied from the controller 302 to record an image by transferring and fixing the latent image onto a recording medium (i.e., electrophotographic process).

Figure 2:
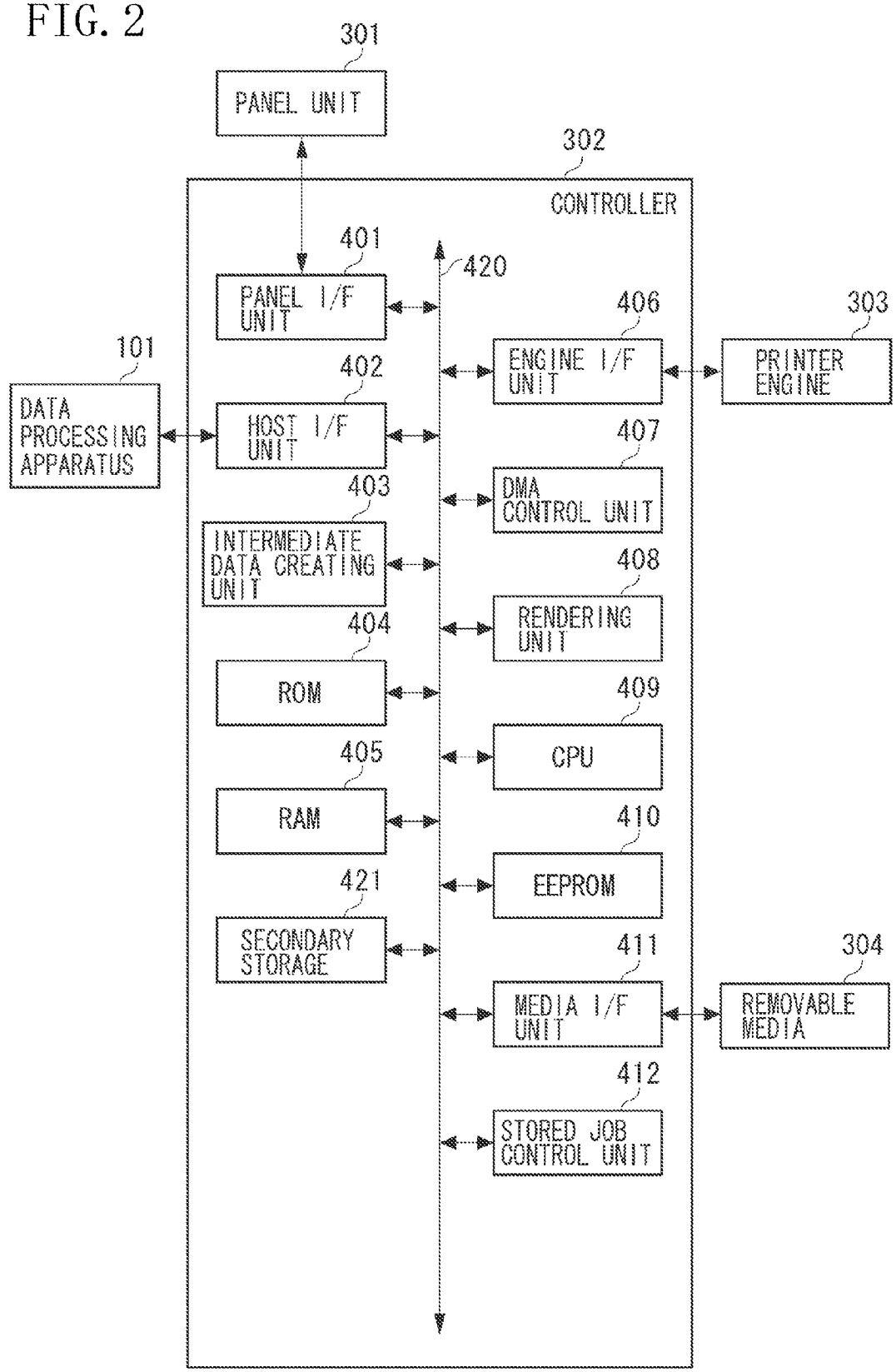
FIG. 2 illustrates an example of a configuration of a controller.

A configuration of the controller 302 is described below. FIG. 2 illustrates an example of the configuration of the controller 302. A panel interface unit (panel I/F unit) 401 provides a data communication with the panel unit 301. A host interface unit (host I/F unit) 402 is connected to the data processing apparatus 101 such as a host computer via the network so as to establish a bidirectional communication therebetween. An intermediate data creating unit 403 converts print data received from the data processing apparatus 101 via the host I/F unit 402 into intermediate data that is friendly in the printer 102.

A read only memory (ROM) 404 holds a program for controlling the printer 102 (i.e., a control program code). A random access memory (RAM) 405 stores different types of data. A control processing unit (CPU) 409 causes the RAM 405 to store data such as received print data, intermediate data generated by interpreting the print data, bitmap data generated by rendering the intermediate data, and various temporal processing statuses required in the other processing.

A secondary storage 421 stores print data, log information, and the like received via the host I/F unit 402. Examples of the secondary storage 421 include a hard disk drive (HDD) and a secure digital (SD) card.

An engine interface unit (engine I/F unit) 406 is communicatively connected to the printer engine 303. A direct memory access (DMA) control unit 407 transfers the bitmap data stored in the RAM 405 to the engine I/F unit 406 according to an instruction of the CPU 409. A rendering unit 408 develops the bitmap data into a bitmap image according to contents of the intermediate data stored in the RAM 405 (i.e., generates bitmap data based on the intermediate data).

The CPU 409 controls devices connected to a CPU bus 420 based on control program codes stored in the ROM 404. For example, the CPU 409 receives various instructions (e.g., a setting instruction) from the user via the panel unit 301 and the panel I/F unit 401. Further, for example, the CPU 409 grasps a state of the printer engine 303 via the engine I/F unit 406.

An electrically erasable programmable read-only memory (EEPROM) 410 is a nonvolatile memory that holds setting information of the printer 102. A media interface unit (media I/F unit) 411 reads/writes different types of data, e.g., image data, program data and device setting data, from/into a removable media 304 such as a universal serial bus (USB) memory. The CPU bus 420 includes an address bus, a data bus, and a control bus. The above described devices, each connected to the CPU bus 420, are mutually accessible.

A stored job control unit 412 is a module of a program held by the ROM 404. The program is stored in the RAM 405 of the controller 302 to be executed by the CPU 409. In other words, the CPU 409 performs processing according to steps of the program stored in the ROM 404. As a result thereof, functions of the printer 102 and processing according to the below described flow chart are realized.

The CPU 409 stores print data received from the data processing apparatus 101 in a storage unit such as the RAM 405 or the secondary storage 421 in the form of a print job via the stored job control unit 412 and deletes the print job having been stored from the storage unit.

Figure 3:
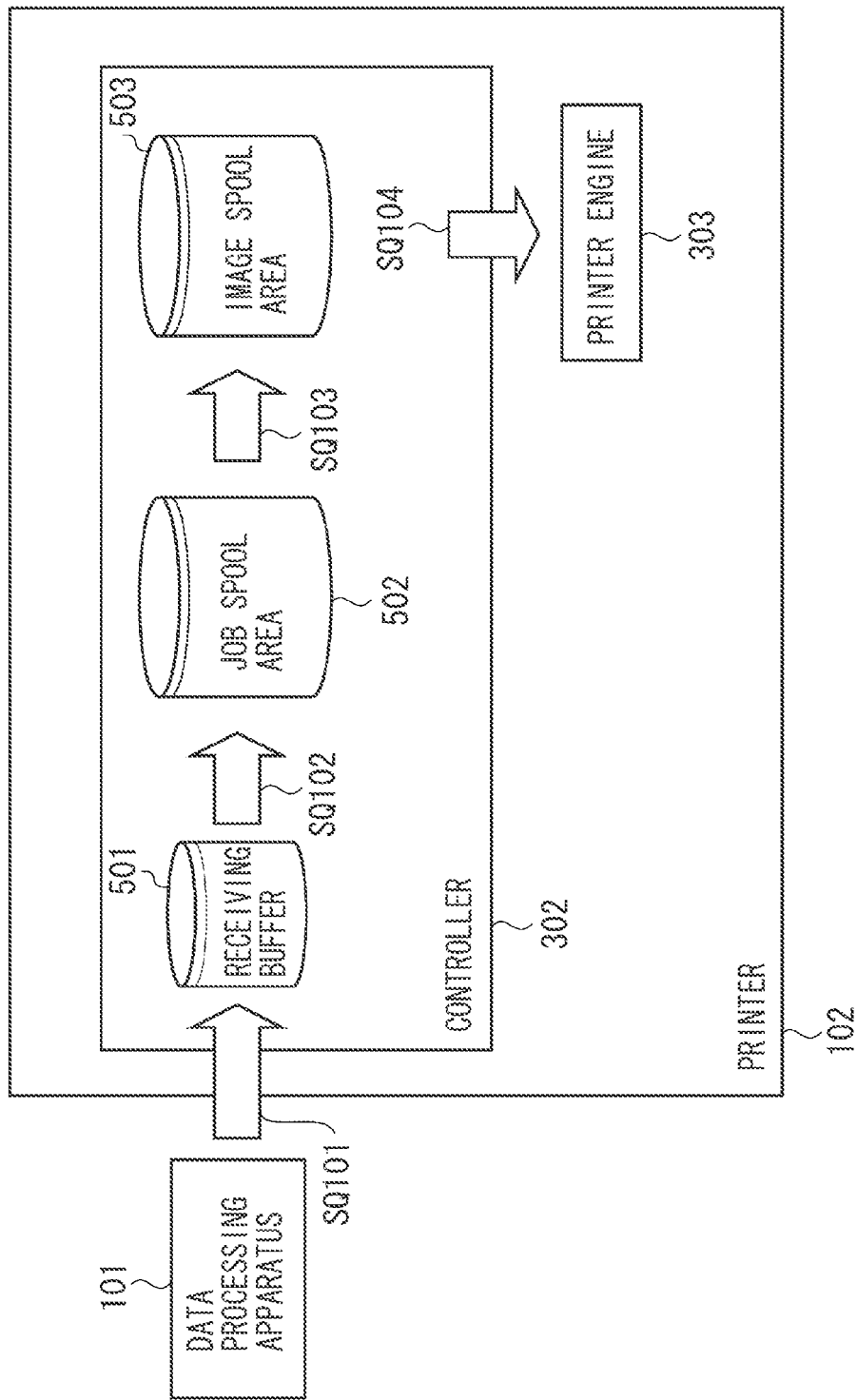
FIG. 3 illustrates an example of a data flow.

A data flow is described below. FIG. 3 illustrates an example of the data flow in the controller 302. A receiving buffer 501 is logically secured in the RAM 405. A job spool area 502 is an area (i.e., storage area) logically secured in the RAM 405 or the secondary storage 421. The receiving buffer 501 has a capacity generally smaller than that of the job spool area 502. An image spool area 503 is logically secured in the RAM 405.

The host I/F unit 402 determines whether there is a free space in the receiving buffer 501. In a case where the host I/F unit 402 determines there is a free space in the receiving buffer 501, the host I/F unit 402 receives print data from the data processing apparatus 101 to store it in the receiving buffer 501 (SQ101).

Upon receiving a notification to the effect that the print data is stored in the receiving buffer 501, the stored job control unit 412 confirms there is a free space in the job spool area 502 that is at least the same size as a capacity of the receiving buffer 501. If there is no free space in the job spool area 502, the stored job control unit 412 waits until the free space can be secured therein. If there is a free space in the job spool area 502, the stored job control unit 412 stores the print data in the job spool area 502 in the form of a print job as well as deletes the print data in the receiving buffer 501 to make the receiving buffer 501 empty (SQ102). As described below with reference to FIGS. 6 and 7, the stored job control unit 412 asynchronously performs the deletion processing for deleting the print job (i.e., stored job) stored in the job spool area 502.

The intermediate data creating unit 403 reads out the print job stored in the job spool area 502 and performs PDL interpretation processing (i.e., intermediate data creation processing), provided that a free space of a predetermined size exists in an image spool area 503. Intermediate data created by the intermediate data creating unit 403 is stored in a buffer (not illustrated) logically secured in the RAM 405.

The rendering unit 408 starts rendering processing according to the intermediate data stored in a buffer (not illustrated) and stores a bitmap image generated by the rendering processing in the image spool area 503 (SQ103). The engine I/F unit 406 transfers the bitmap image in the image spool area 503 to the printer engine 303 via the DMA control unit 407 while getting synchronization with the printer engine 303 (SQ104).

A reprint mode is described below. The controller 302 has a reprint mode as a print mode in addition to the normal mode in which the print data transmitted from the data processing apparatus 101 is received to print it. The controller 302 switches the print mode between the reprint mode and the normal mode according to a setting value set via, for example, a user menu of a main apparatus body. In the reprint mode, a print job that has been printed once is left to be kept in the job spool area 502 and the stored print job is reprinted (i.e., is printed at a different timing) according to a print instruction responding to the user operation. In the reprint mode, the controller 302 (i.e., stored job control unit 412) controls so as not to delete but to remain the print job stored in the job spool area 502 after the completion of the print job. In the reprint mode, the controller 302 manages the stored job according to a stored job management table which is described below with reference to FIG. 4.

The controller 302 displays information of the stored jobs in the job spool area 502 in the form of a printable job list on the panel unit 301 via the panel I/F unit 401. An exemplary screen illustrating the reprintable job list is illustrated in FIG. 5. In a case where the controller 302 determines that a reprint instruction is received from the user via the panel unit 301 with respect to the reprintable job list displayed on the panel unit 301, the controller 302 prints the stored job targeted by the instruction.

The controller 302 changes the timing for deleting the stored job in the job spool area 502 between the reprint mode and the normal mode. The deletion processing for deleting the stored job in the normal mode is described below with reference to FIG. 6. The deletion processing for deleting the stored job in the reprint mode is described below with reference to FIG. 7.

A description is made below as to a stored job management table. FIG. 4 illustrates an example of the table with which the stored job control unit 412 manages the stored jobs (i.e., stored job management table). The stored job management table includes information of all the stored jobs in the job spool area 502. The stored job management table is stored in a management area in the job spool area 502.

Upon transferring the print data stored in the receiving buffer 501 to the job spool area 502, the stored job control unit 412 determines whether the transferred data is new data (i.e., a new job). In a case where the stored job control unit 412 determines that the transferred data is a new job, the stored job control unit 412 analyzes (interprets) job information of the print data and extracts information on, for example, a job ID, a job owner, a job name, and a job size to newly register it in the stored job management table. At the same time, the stored job control unit 412 registers a time of day (i.e., time) at which the print data is stored as a new job as information of a stored time (i.e., retention time) of the target job. The stored job control unit 412 registers or updates information of the last print time (i.e., executed time) of the target job according to a notification from the engine I/F unit 406 to the effect that printing is completed (i.e., a job completion notification).

A description is made as to reprint instruction screens. FIG. 5 illustrates examples of UI screens through which the panel I/F unit 401 receives the reprint instruction (i.e., reprint instruction screens).

Figure 5A:

FIG. 5A illustrates a job menu screen for operating a job stored in the job spool area 502 (i.e., stored job). In the job menu screen, when the user selects "reprint" via the panel unit 301, the panel interface unit 401 displays a screen of FIG. 5B according to information on the job owner of the stored job management table via the stored job control unit 412.

Figure 5B:

FIG. 5B illustrates a reprintable owner list, more specifically, a screen for designating a job owner who is instructing the reprint (i.e., inputting information on a job owner). For example, when the user selects "UID0004" via the panel unit 301, the panel I/F unit 401 acquires information on a job name corresponding to the job owner "UID0004" from the stored job management table via the stored job control unit 412. The panel I/F unit 401 displays a screen of FIG. 5C according to the information on the job name.

FIG. 5C illustrates a job list that the job owner "UID0004" can reprint, more specifically, a screen for designating a target job to be reprinted (i.e., inputting information on reprint). For example, when the user selects "sharing list" via the panel unit 301, the panel I/F unit 401 acquires information "JID001" on a job ID corresponding to the job name "sharing list" via the stored job control unit 412 from the stored job management table. Then, the panel I/F unit 401 displays a screen of FIG. 5D according to the information "JID001" on the job ID.

FIG. 5D illustrates a confirmation screen for confirming a start of reprint. For example, when the user selects "YES" via the panel unit 301, the panel I/F unit 401 instructs the stored job control unit 412 to start reprint of the job ID "JID001". The stored job control unit 412 generates a job for reprint according to the instruction for starting the reprint of the job ID "JID001" from the panel I/F unit 401 (i.e., acquires a print job corresponding to the job ID "JID001" from the job spool area 502).

Figure 6:
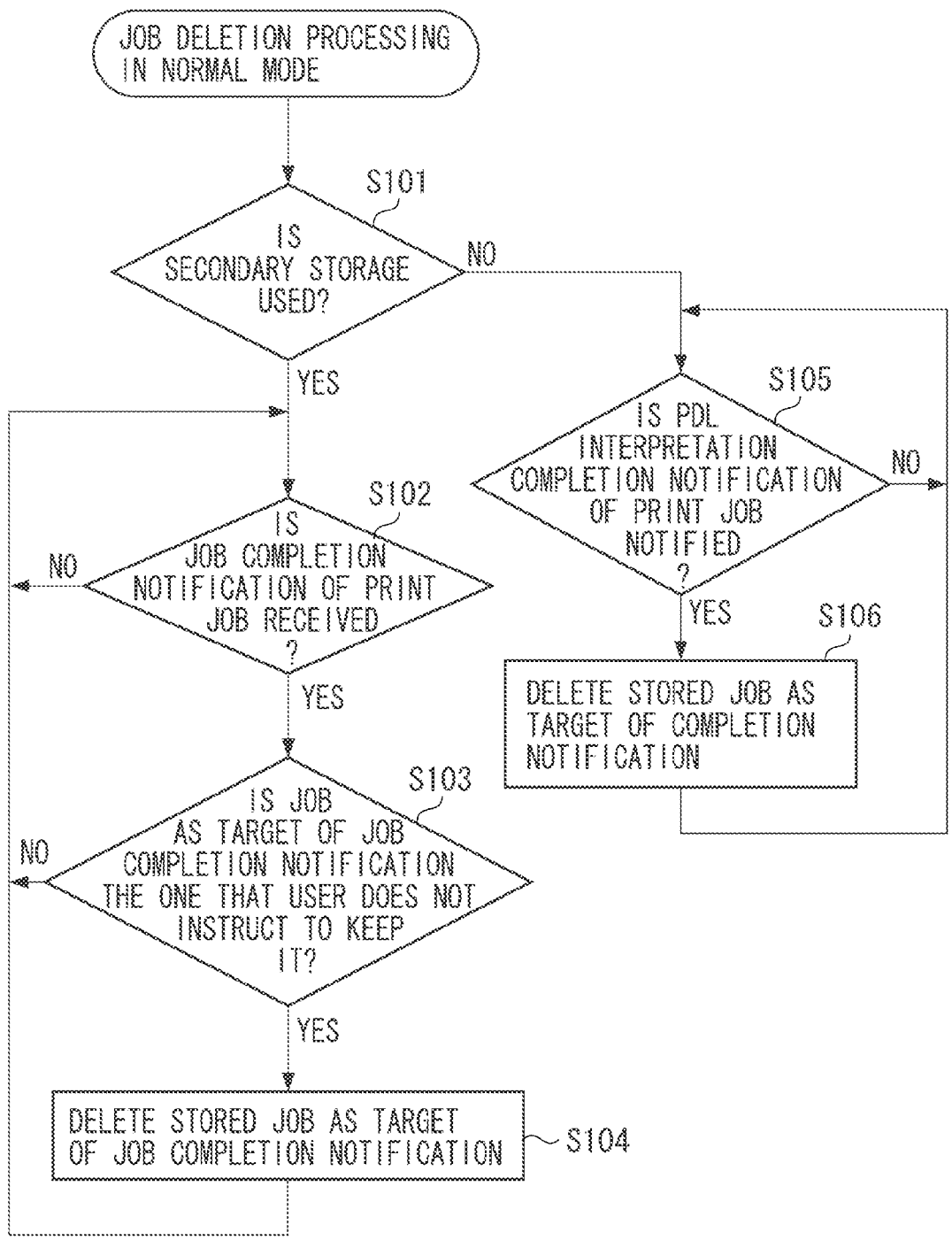
FIG. 6 illustrates an example of a flow chart according to deleting processing in a normal mode.

A description is made as to stored job deleting processing. FIG. 6 illustrates an example of a flow chart according to a processing program in which the stored job control unit 412 deletes the stored job in the normal mode.

In the processing in which the stored job control unit 412 deletes the stored job in the normal mode, contents of the processing differ from each other between a case where the secondary storage is used and a case where the secondary storage is not used. For example, when the secondary storage is used, the stored job control unit 412 generates a stored job in response to an instruction of the user. Without the instruction of the user to delete the stored job (i.e., deletion instruction), the stored job control unit 412 does not delete the stored job.

In step S101, the stored job control unit 412 determines whether the setting is set to use the secondary storage. In a case where the stored job control unit 412 determines based on the setting information that the setting is set to use the secondary storage (YES in step S101), the processing proceeds to step S102. On the other hand, in a case where the stored job control unit 412 determines based on the setting information that the setting is set not to use the secondary storage (NO in step S101), the processing proceeds to step S105.

In step S102, the stored job control unit 412 determines whether a job completion notification of the print job is received from the engine I/F unit 406. In a case where the stored job control unit 412 determines that the job completion notification is received (YES in step S102), the processing proceeds to step S103. On the other hand, in a case where the stored job control unit 412 determines that the job completion notification is not received (NO in step S102), the processing in step S102 is repeated.

In step S103, the stored job control unit 412 determines whether the job as a target of the job completion notification is the one that the user instructs to store. In a case where the stored job control unit 412 determines based on the setting information that the job as a target of the job completion notification is the one that the user instructs to store (NO in step S103), the processing returns to step S102. On the other hand, in a case where the stored job control unit 412 determines based on the setting information that the job as a target of the job completion notification is not the one that the user instructs to store (YES in step S103), the processing proceeds to step S104. In step S104, the stored job control unit 412 deletes the stored job as a target of the job completion notification from the job spool area 502. After the stored job control unit 412 deletes the stored job as a target of the job completion notification from the job spool area 502, the processing returns to step S102 to repeat the steps thereafter.

In step S105, the stored job control unit 412 determines whether a PDL interpretation completion notification is received from the intermediate data creating unit 403. In a case where the stored job control unit 412 determines that the PDL interpretation completion notification is received (YES in step S105), in step S106, the stored job control unit 412 deletes the stored job as a target of the PDL interpretation completion notification from the job spool area 502 and the processing subsequently returns to step S105. On the other hand, in a case where the stored job control unit 412 determines that the PDL interpretation completion notification is not received (NO in step S105), the processing of step S105 is repeated.

Figure 7:
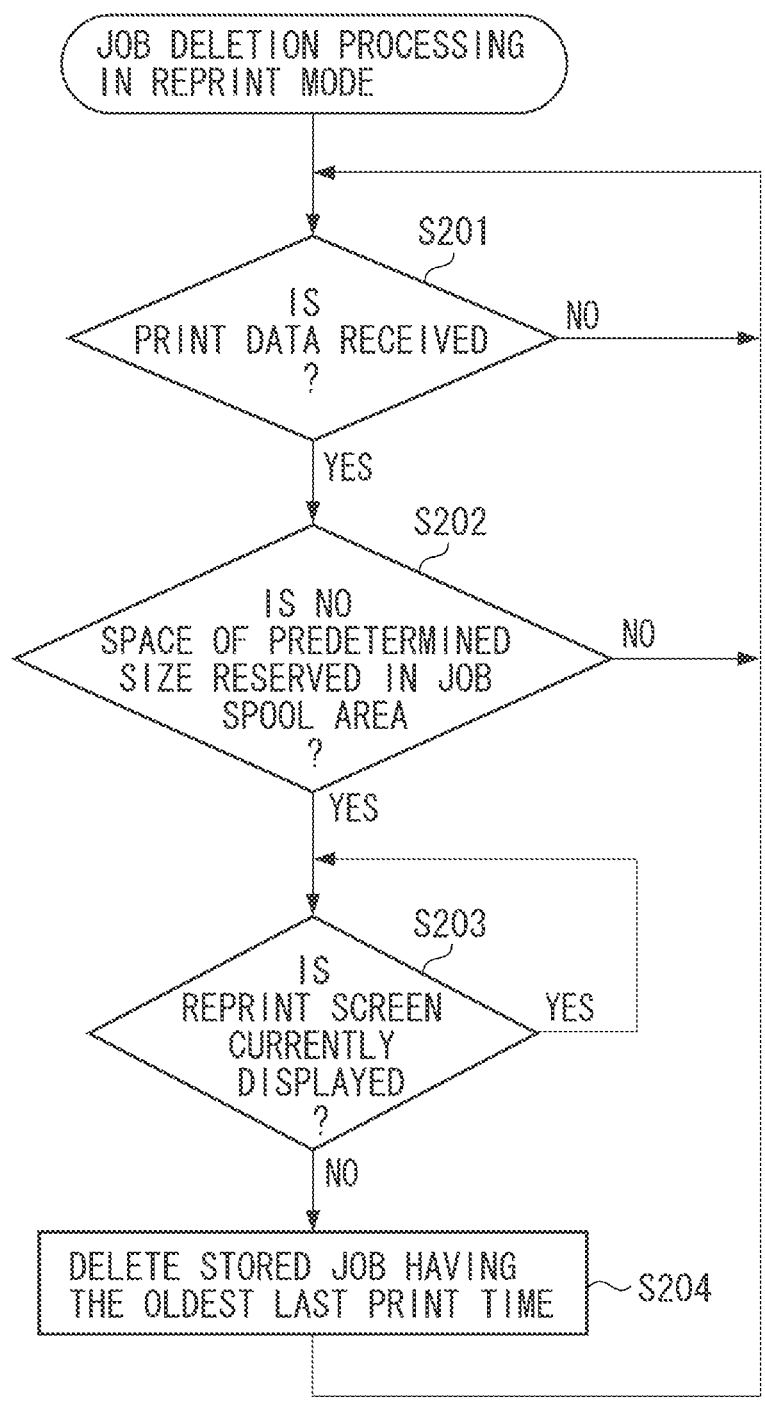
FIG. 7 illustrates an example of a flow chart according to deleting processing in a reprint mode.

FIG. 7 is an example of a flow chart according to a processing program with which the stored job control unit 412 deletes the stored job in the reprint mode.

The stored job control unit 412 determines whether a print data reception notification is received from the host I/F unit 402. The print data reception notification is generated such that, in SQ101 in FIG. 3, the host I/F unit 402 receives print data from the data processing apparatus 101 to store it in the receiving buffer 501. In a case where the stored job control unit 412 determines that the print data reception notification is received from the host I/F unit 402 (YES in step S201), the processing proceeds to step S202. On the other hand, in a case where the stored job control unit 412 determines that the print data reception notification is not received from the host I/F unit 402 (NO in step S201), the processing of step S201 is repeated.

In step S202, the stored job control unit 412 determines whether free space of a predetermined size is reserved in the job spool area 502. In the present exemplary embodiment, a description is made provided that the free space of the predetermined size is identical to that of the receiving buffer 501. The free space of the predetermined size, however, may be free space of any size that is preliminary set. The stored job control unit 412 determines whether a value obtained such that the summed value of job sizes in the stored job management table is subtracted from a size of the entire job spool area 502 is smaller than the size of the receiving buffer 501 (i.e., whether the job spool area 502 is short of a storage area). In a case where the stored job control unit 412 determines that the value is smaller (YES in step S202), the processing proceeds to step S203 to delete any of the stored jobs. On the other hand, in a case where the stored job control unit 412 determines that the value is not smaller (NO in step S202), the step returns to step S201 since it is not necessary to delete the stored job.

In step S203, the stored job control unit 412 makes an inquiry to the panel I/F unit 401 as to whether a job list of the jobs as candidates for the reprint is displayed. "A job list of the jobs as candidates for the reprint is displayed" also includes a time period for displaying screens from a time that the job list is displayed to a time that the screen returns to an initial screen, for example, as it is illustrated in FIG. 5C or 5D. The stored job control unit 412 pauses (stops) the deletion processing for deleting the stored job while the job list of the jobs as candidates for the reprint is displayed and waits until the display of the job list of the jobs as candidates for the reprint is cancelled.

In step S204, in a case where the panel I/F unit 401 notifies cancel of the display of the job list of the jobs as candidates for the reprint, the stored job control unit 412 specifies the stored job having the oldest last print time in the stored job management table to delete it. However, among the jobs stored in the job spool area 502, a job in printing and jobs to be printed subsequently are not targeted to be deleted. If the size of the deleted job is smaller than a value of the predetermined size in step S202 (e.g., a size identical to that of the receiving buffer 501), the stored job control unit 412 repeats the deletion processing until the free space of the job spool area 502 becomes larger than the predetermined size. When the processing of step S204 ends, the stored job control unit 412 repeats the processing from step S201.

As described above, by prohibiting automatic deletion of the stored jobs while the job list for reprinting is displayed, the stored job of which reprint is instructed can be prevented from being deleted before the reprint thereof is started according to a reception of a new job. In other words, the job designated in the job list for reprinting can be securely reprinted.

A second exemplary embodiment is described below. In step S204 of FIG. 7 of the first exemplary embodiment, the stored job control unit 412 specifies the stored job having the oldest last print time in the stored job management table to delete it. However, the present invention is not limited to the above configuration. The present exemplary embodiment employs such a configuration that, for example, the stored job control unit 412 specifies the stored job having the oldest stored time to delete it. The present exemplary embodiment may also be configured such that both of the above described deletion processing are switched to each other.

A third exemplary embodiment is described below. In step S203 of FIG. 7 of the first exemplary embodiment, the stored job control unit 412 is configured to, but not limited thereto, suspend the deletion processing for deleting the stored job while the job list of the jobs as candidates for the reprint is displayed. For example, the present exemplary embodiment employs such a configuration that the processing of step S204 is performed without suspending the deletion processing for deleting the stored job.

In a case where the stored job to which the reprint is instructed is deleted before starting the reprint according to the reception of a new job, the panel I/F unit 401 displays a message to the effect that the target stored job is deleted immediately after the above instruction is received.

With the configurations of the above described exemplary embodiments, more suitable response can be made with respect to the execution of job based on the user operation.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-234859 filed Oct. 19, 2010, which is hereby incorporated by reference herein in its entirety.

What is claimed is:

1. An image forming apparatus, comprising:
a receiving buffer configured to store job data transmitted from an information processing apparatus;

a storage unit configured to store job data transmitted from the receiving buffer;

a display unit configured to display information of job data stored in the storage unit in a case where an execution instruction for executing job data is received in response to a user operation; and a control unit configured to determine whether the display unit displays information of job data, and to control the transmission of job data from the receiving buffer to the storage unit such that the transmission of job data from the receiving buffer to the storage unit is stopped in a case where it is determined by the determination that the display unit displays the information of job data, and the transmission of job data from the receiving buffer to the storage unit is executed in a case where it is determined by the determination that the display unit does not displays the information of job data, wherein another job data in the storage unit is deleted in response to the execution of the transmission of the job data.

2. The image forming apparatus according to claim 1, wherein, in a case where the control unit determines that a size of a storage area for storing the job data is smaller than a predetermined size and that the display unit does not display the information of job data, the control unit deletes job data stored in the storage unit until the predetermined size is secured.

3. The image forming apparatus according to claim 1, wherein the job data stored in the storage unit is print job data and the display unit displays the information of job data stored in the storage unit as a candidate to be reprinted.

4. The image forming apparatus according to claim 1, wherein the control unit deletes job data sequentially from the job data having older execution time information indicating when the job data is executed in the job data stored in the storage unit.

5. The image forming apparatus according to claim 1, wherein the control unit deletes sequentially from job data having older storage time information indicating when the job data is stored in the storage unit in the job data stored in the storage unit.

6. A job management method in an image forming apparatus, comprising:

storing job data transmitted from an information processing apparatus in a receiving buffer;

transmitting job data stored in the receiving buffer from the receiving buffer to a storage unit to store job data in the storage unit;

displaying information of the job data stored in the storage unit on a display unit upon receiving an execution instruction for executing the job data in response to a user operation;

determining whether the display unit displays the information of the job data; and controlling the transmitting of job data from the receiving buffer to the storage unit such that the transmitting of job data from the receiving buffer to the storage unit is stopped in a case where it is determined by the determining that the display unit displays the information of job data, and the transmitting of job data from the receiving buffer to the storage unit is executed in a case where it is determined by the determining that the display unit does not display the information of job data, wherein another job data in the storage unit is deleted in response to the execution of the trans mission of the job data.

7. A non-transitory computer-readable storage medium storing a control program for causing a computer to perform operations comprising:

storing job data transmitted from an information processing apparatus in a receiving buffer;

transmitting job data stored in the receiving buffer from the receiving buffer to a storage unit to store job data in a the storage unit;

displaying information of the job data stored in the storage unit on a display unit upon receiving an execution instruction for executing the job data in response to a user operation;

determining whether the display unit displays the information of the job data; and controlling the transmitting of job data from the receiving buffer to the storage unit such that the transmitting of job data from the receiving buffer to the storage unit is stopped in a case where it is determined by the determining that the display unit displays the information of job data, and the transmitting of job data from the receiving buffer to the storage unit is executed in a case where it is determined by the determining that the display unit does not display the information of job data, wherein another job data in the storage unit is deleted in response to the execution of the trans mission of the job data.

\* \* \* \* \*